E. ASCHBACHER.
ROLLING PIN.
APPLICATION FILED MAY 25, 1915.

1,164,777.

Patented Dec. 21, 1915.

Inventor
E. Aschbacher

Witnesses
G. J. L. Wright
C. C. Hines

By Victor J. Evans
Attorney

UNITED STATES PATENT OFFICE.

EDWARD ASCHBACHER, OF WILMETTE, ILLINOIS.

ROLLING-PIN.

1,164,777. Specification of Letters Patent. Patented Dec. 21, 1915.

Application filed May 25, 1915. Serial No. 30,439.

*To all whom it may concern:*

Be it known that I, EDWARD ASCHBACHER, a citizen of the United States, residing at Wilmette, in the county of Cook and State of Illinois, have invented new and useful Improvements in Rolling-Pins, of which the following is a specification.

This invention relates to rolling pins, and its primary object is to provide a rolling pin of simple construction, whereby the pin may be supported and operated by means of one hand, leaving the other hand of the operator free to manipulate the dough.

A further object of the invention is to provide a rolling pin having a supporting frame of novel construction provided with a handle and an arm rest, whereby the desired advantages are secured.

The invention consists of the features of construction, combination and arrangement of parts herein fully described and claimed, reference being had to the accompanying drawing in which:—

Figure 1:
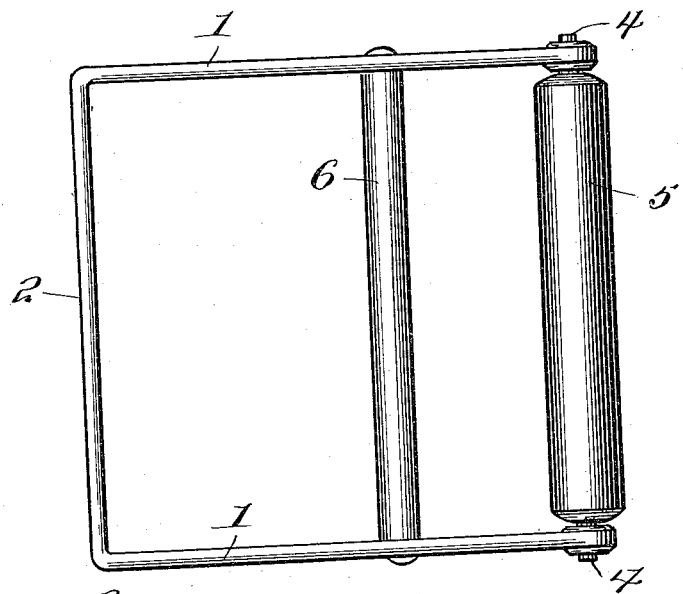
Figure 2:
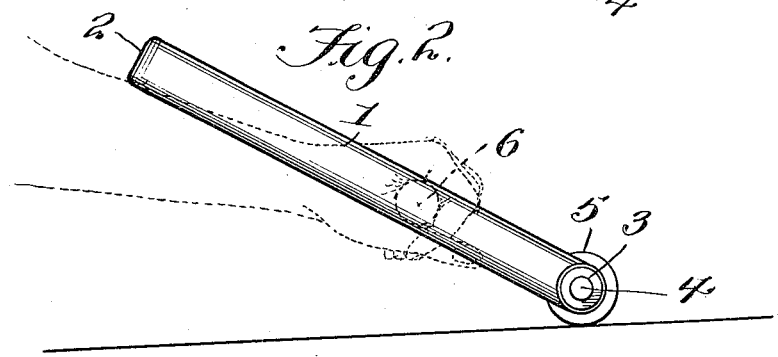
Figure 3:

Figure 1 is a top plan view of a rolling pin embodying my invention. Fig. 2 is a side elevation illustrating the mode of use of the device. Fig. 3 is a vertical longitudinal section.

In carrying my invention into practice, I provide a rolling pin comprising a looped frame formed of parallel side bars 1 connected at their outer or rear ends by a cross bar 2. The forward ends of the side bars 1 are provided with bearing openings 3 for the journals 4 of the roller 5, which extends across and projects peripherally beyond the open end of the U-shaped frame as shown, whereby the roller is adapted for use without interference in rolling the dough in the usual way.

The device is provided with a handle 6 which extends between the cross bars 1 at a point between the end bar 2 and the roller 5, and preferably between the transverse center of the looped frame and the roller.

In the use of the device, the handle 6 is grasped by the operating hand of the user and the device held in a properly inclined position to bring the roller 5 to bear upon and travel easily over the surface of the dough. In this position of use the wrist and fore-arm extend beneath the cross bar 2, which rests upon the fore-arm and thus serves as a rest or brace by which the device may be conveniently held in the hand and run across the surface of the dough, leaving the other hand of the user free to manipulate the dough as occasion may require.

The device is thus of particular advantage over rolling pins of ordinary construction, and may nevertheless be furnished at a low cost.

I claim:—

1. A rolling pin including a frame having a handle and a cross bar, a roller journaled upon the frame, said handle being arranged between the cross bar and roller, and said cross bar being adapted to rest upon the arm of the operator to adapt the device to be held in a single hand and manipulated.

2. A rolling pin comprising a U-shaped frame including side bars, a handle connecting the side bars intermediate their ends, a roller journaled upon the forward ends of the side bars and extending across the open end of the frame, and a cross bar connecting the side bars at their opposite ends and forming a rest to bear upon the fore-arm of the operator.

3. A rolling pin comprising a pair of parallel side bars, a roller journaled in said bars at one end thereof, a rest bar extending transversely between and connecting the other ends of the aforesaid bars, and a transverse grip member extending between the first-named bars at a point just in advance of the transverse center of said bars and between the same and the roller.

4. A rolling pin comprising a frame formed of a pair of parallel side plates having bearing openings at one end thereof and connected by a cross piece at the opposite end thereof, a roller extending across the open end of the frame and journaled in said bearings, and a grip rod or bar extending transversely between the side plates of the frame at a point between the transverse center of said frame and said roller, forming spaces in front and rear of the grip, said parts being arranged to permit of the passage of the hand of the operator beneath the cross bar of the handle and with the palm inverted so as to dispose the back of the hand upward and adapt the grip to be engaged by the folded hand resting thereon, whereby in the rolling operation the cross bar will extend above and across and rest upon the fore arm to hold the device against pivotal motion on the grip as an axis from the pressure falling upon the roller.

In testimony whereof I affix my signature in presence of two witnesses.

EDWARD ASCHBACHER.

Witnesses:
ETHEL A. MCDONELL,
JOSEPH E. SOHUCEK.